United States Patent
Yagasaki

(10) Patent No.: US 12,282,099 B2
(45) Date of Patent: Apr. 22, 2025

(54) INFORMATION PROCESSING APPARATUS AND CONTROL METHOD FOR DISTANCE MEASUREMENT BASED ON LIGHT EMISSION

(71) Applicant: SONY GROUP CORPORATION, Tokyo (JP)

(72) Inventor: Yoichi Yagasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 335 days.

(21) Appl. No.: 17/753,717

(22) PCT Filed: Sep. 15, 2020

(86) PCT No.: PCT/JP2020/034990
§ 371 (c)(1),
(2) Date: Mar. 11, 2022

(87) PCT Pub. No.: WO2021/054342
PCT Pub. Date: Mar. 25, 2021

(65) Prior Publication Data
US 2022/0342075 A1    Oct. 27, 2022

(30) Foreign Application Priority Data
Sep. 20, 2019    (JP) ................. 2019-171172

(51) Int. Cl.
*G01S 17/894*    (2020.01)
*A63F 13/525*    (2014.01)
(Continued)

(52) U.S. Cl.
CPC .......... *G01S 17/894* (2020.01); *A63F 13/525* (2014.09); *G01S 7/4865* (2013.01); *G06F 3/147* (2013.01)

(58) Field of Classification Search
None
See application file for complete search history.

(56) References Cited

U.S. PATENT DOCUMENTS

2007/0200747 A1    8/2007 Okai et al.
2012/0194516 A1*   8/2012 Newcombe ............. G06T 17/00
                                                                345/420
(Continued)

FOREIGN PATENT DOCUMENTS

BR    112016029603 A2    8/2017
CA          2951461 A1   12/2015
(Continued)

OTHER PUBLICATIONS

International Search Report and Written Opinion of PCT Application No. PCT/JP2020/034990, issued on Nov. 10, 2020, 12 pages of ISRWO.

*Primary Examiner* — Joni Hsu
(74) *Attorney, Agent, or Firm* — CHIP LAW GROUP

(57) ABSTRACT

Provided is an information processing apparatus that avoids interference of rays of light to be emitted from respective terminals for performing distance measurement. The information processing apparatus includes a first light emission unit that performs light emission of invisible light for performing distance measurement, a first acquisition unit that acquires depth information of a real space on the basis of the light emission by the first light emission unit, a control unit that controls the light emission by the first light emission unit, and a communication unit that performs communication with another information processing apparatus. The control unit performs control causing the first light emission unit to perform the light emission at a timing not overlapping a light emission timing of a second light emission unit of the other information processing apparatus, on the basis of the
(Continued)

communication with the other information processing apparatus.

19 Claims, 14 Drawing Sheets

(51) Int. Cl.
  *G01S 7/4865* (2020.01)
  *G06F 3/147* (2006.01)

(56) References Cited

U.S. PATENT DOCUMENTS

| | | | |
|---|---|---|---|
| 2012/0194650 A1 | 8/2012 | Izadi et al. | |
| 2014/0002496 A1* | 1/2014 | Lamb | G09G 5/00 |
| | | | 345/633 |
| 2015/0083921 A1 | 3/2015 | Ooyabu | |
| 2015/0248120 A1 | 9/2015 | Haug et al. | |
| 2015/0373322 A1 | 12/2015 | Goma et al. | |
| 2018/0352167 A1* | 12/2018 | Okada | H04N 23/62 |
| 2018/0365265 A1* | 12/2018 | Blanc | G08G 5/003 |
| 2018/0372869 A1 | 12/2018 | Namba et al. | |
| 2019/0110039 A1* | 4/2019 | Linde | H04N 13/398 |
| 2019/0293791 A1* | 9/2019 | Iwai | G01C 3/06 |
| 2021/0333372 A1* | 10/2021 | Akahori | G01S 17/894 |

FOREIGN PATENT DOCUMENTS

| | | |
|---|---|---|
| CN | 102638692 A | 8/2012 |
| CN | 106461783 A | 2/2017 |
| CN | 108431629 A | 8/2018 |
| DE | 102014112259 A1 | 3/2015 |
| DE | 102014203723 A1 | 9/2015 |
| EP | 1826586 A1 | 8/2007 |
| EP | 3158286 A1 | 4/2017 |
| EP | 3396414 A1 | 10/2018 |
| JP | 2007-232498 A | 9/2007 |
| JP | 2010-048716 A | 3/2010 |
| JP | 2014-191688 A | 10/2014 |
| JP | 2015-064840 A | 4/2015 |
| JP | 2015-165234 A | 9/2015 |
| JP | 2017-527777 A | 9/2017 |
| JP | 2018-066713 A | 4/2018 |
| JP | 2019-152899 A | 9/2019 |
| KR | 10-2017-0017927 A | 2/2017 |
| WO | 2015/195318 A1 | 12/2015 |
| WO | 2017/110418 A1 | 6/2017 |

* cited by examiner

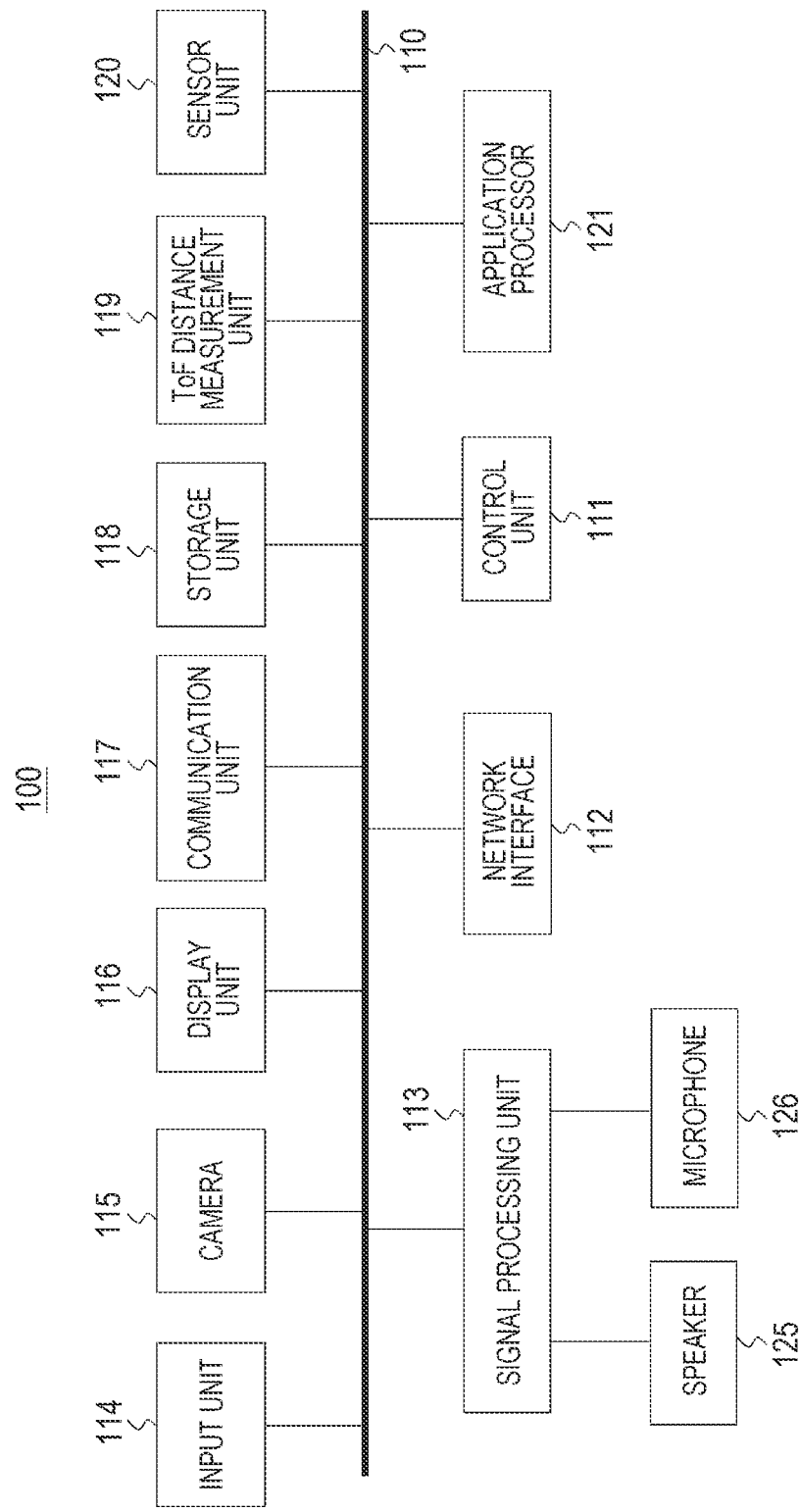

Step1

Step2

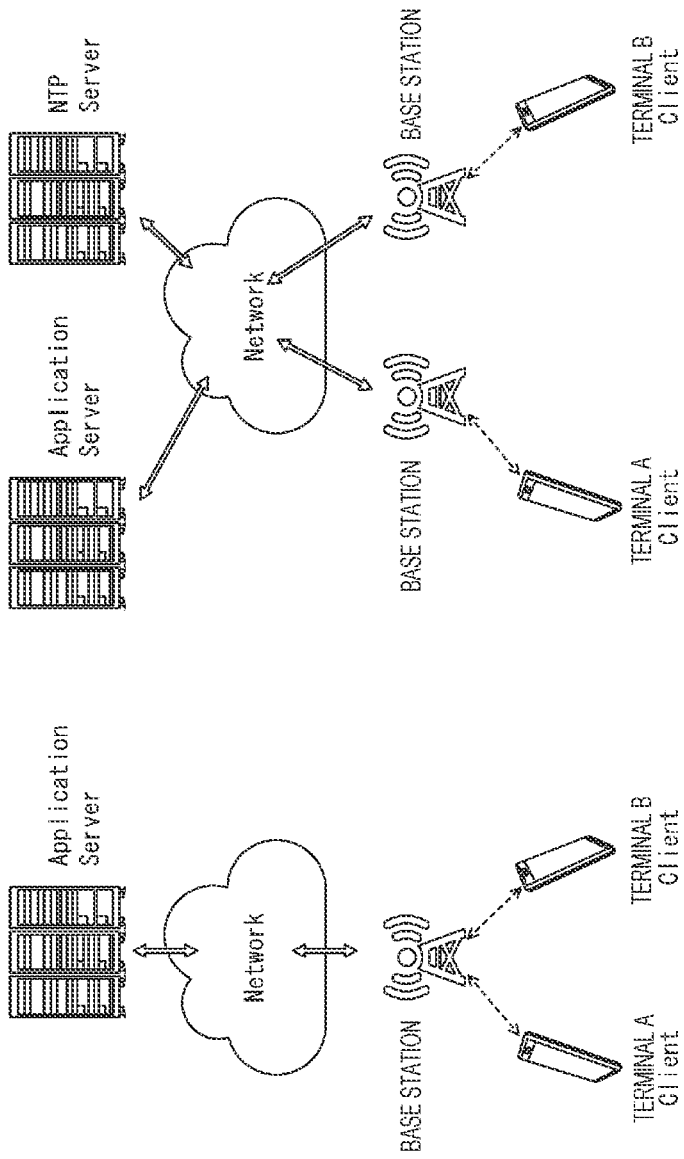

INFORMATION PROCESSING APPARATUS AND CONTROL METHOD FOR DISTANCE MEASUREMENT BASED ON LIGHT EMISSION

CROSS REFERENCE TO RELATED APPLICATIONS

This application is a U.S. National Phase of International Patent Application No. PCT/JP2020/034990 filed on Sep. 15, 2020, which claims priority benefit of Japanese Patent Application No. JP 2019-171172 filed in the Japan Patent Office on Sep. 20, 2019. Each of the above-referenced applications is hereby incorporated herein by reference in its entirety.

TECHNICAL FIELD

The present technology relates to an information processing apparatus and a control method, and specifically relates to an information processing apparatus and a control method for favorably performing distance measurement based on light emission.

BACKGROUND ART

For example, Patent Document 1 describes a technology for sharing an augmented reality (AR) space among a plurality of terminals. According to this technology, a position and an orientation of a real object are recognized by detecting a marker attached to the real object, and a virtual object is superimposed and displayed on the real object in accordance with a motion state of the real object.

In sharing the AR space among the plurality of terminals in this way, the use of depth information of a real space enables more precise superimposition and display of the virtual object on the real object. Examples of distance measurement for acquiring the depth information of the real space include schemes, such as time of flight (ToF) and structured light, to be performed by emission of invisible light, for example, infrared (IR) light.

CITATION LIST

Patent Document

Patent Document 1: Japanese Patent Application Laid-Open No. 2014-191688

SUMMARY OF THE INVENTION

Problems to be Solved by the Invention

In sharing the AR space among the plurality of terminals, each terminal emits, for example, IR light for performing the distance measurement. On this occasion, when the respective terminals emit rays of IR light at different timings, the rays of IR light from the respective terminals undergo interference, resulting in a problem of decreased distance measurement accuracy.

An object of the present technology is to avoid interference of rays of light to be emitted from respective terminals for performing distance measurement, thereby preventing decrease in accuracy of depth information acquired through the distance measurement by each terminal.

Solutions to Problems

A concept of the present technology involves an information processing apparatus including:

a first light emission unit configured to perform light emission of invisible light for performing distance measurement;

a first acquisition unit configured to acquire depth information of a real space on the basis of the light emission by the first light emission unit;

a control unit configured to control the light emission by the first light emission unit; and a communication unit configured to perform communication with another information processing apparatus including a second light emission unit configured to perform light emission of invisible light for performing distance measurement and a second acquisition unit configured to acquire depth information of a real space on the basis of the light emission by the second light emission unit, in which the control unit performs control causing the first light emission unit to perform the light emission at a timing not overlapping a light emission timing of the second light emission unit, on the basis of the communication with the other information processing apparatus through the communication unit.

According to the present technology, the first light emission unit performs light emission of invisible light for performing distance measurement. For example, a scheme for the distance measurement may be ToF or structured light. The first acquisition unit acquires depth information of a real space on the basis of the light emission by the first light emission unit. The communication unit performs communication with the other information processing apparatus. The other information processing apparatus includes the second light emission unit configured to perform light emission of invisible light for performing distance measurement and the second acquisition unit configured to acquire depth information of a real space on the basis of the light emission by the second light emission unit. Then, the control unit performs control causing the first light emission unit to perform the light emission at a timing not overlapping a light emission timing of the second light emission unit, on the basis of the communication with the other information processing apparatus through the communication unit.

According to the present technology, as described above, the information processing apparatus causes the first light emission unit to perform the light emission at a timing not overlapping a light emission timing of the second light emission unit of the other information processing apparatus. It is therefore possible to avoid interference of rays of emitted light and it is accordingly possible to prevent decrease in accuracy of depth information acquired through distance measurement.

Note that, in the present technology, for example, the control unit may control processing of an application that performs display of a first augmented reality space, on the basis of the depth information acquired by the first acquisition unit, and the other information processing apparatus may perform control of an application that performs display of a second augmented reality space including at least a part of the first augmented reality space, on the basis of the depth information acquired by the second acquisition unit. Each of the apparatuses (terminals) sharing the AR space can appropriately perform display of an augmented reality space on the basis of depth information about which the decrease in accuracy is prevented.

In this case, for example, the communication unit may transmit information regarding the application to the other information processing apparatus, and the control unit may cause the first light emission unit to perform the light emission on the basis of the information regarding the application.

For example, the information regarding the application may contain information regarding an application display update rate. In this case, for example, the information regarding the application display update rate may be an application display frame rate or an application depth information update rate.

Furthermore, in this case, for example, the other information processing apparatus may cause the second light emission unit to perform the light emission once in one cycle of the application display update rate, and the control unit may cause the first light emission unit to perform the light emission once at a timing not overlapping the light emission timing of the second light emission unit, in one cycle of the application display update rate. It is possible to achieve power saving by controlling the number of light emissions in this way.

Furthermore, for example, the information regarding the application may contain information indicating a timing adjustment scheme. In this case, for example, the timing adjustment scheme may be a token scheme. At this time, for example, in a case where issuance of a token is made a round, the control unit may perform control such that the issuance of the token is waited until a next application display update timing. With this configuration, it is possible to achieve power saving by preventing wasteful light emission in each apparatus.

Furthermore, in this case, for example, the timing adjustment scheme may be a synchronization scheme. Here, the synchronization scheme refers to a scheme essentially involving clock synchronization for each apparatus. At this time, for example, information indicating assignment of a time slot may be transmitted to the other information processing apparatus. With this configuration, each apparatus is capable of favorably avoiding overlap between light emission timings by performing light emission in a time slot assigned thereto.

Furthermore, in this case, the timing adjustment scheme may be determined on the basis of a number of participants in the application. At this time, for example, the control unit may adopt a token scheme in a case where the number of participants is equal to or less than a predetermined number, and may adopt a synchronization scheme in a case where the number of participants is more than the predetermined number. In the case of the synchronization scheme, a time for transmission of a token is unnecessary, which accordingly increases a time usable for light emission. The synchronization scheme is therefore suitable in a case where the number of participants is large. In the case of the token scheme, on the other hand, it is unnecessary to carry out processing of clock synchronization among the apparatuses.

Furthermore, for example, the information regarding the application may contain information indicating priorities of information processing apparatuses regarding the application. In this case, for example, the information indicating the priorities may be information indicating whether an operator or a spectator of the application.

In this case, for example, the information processing apparatus having the lower priority may be controlled to be lower in light emission rate than the information processing apparatus having the higher priority. With this configuration, for example, it is possible to increase the number of information processing apparatuses (terminals) sharing the AR space. Furthermore, in this case, for example, the information processing apparatus having the lower priority may be controlled to be lower in light emission intensity than the information processing apparatus having the higher priority. With this configuration, it is possible to reduce an influence which light emitted from the information processing apparatus having the lower priority exerts on light emitted from the information processing apparatus having the higher priority.

BRIEF DESCRIPTION OF DRAWINGS

FIG. 3 is a block diagram illustrating a configuration example of a terminal.

FIGS. 7A and 7B are diagrams for explaining establishment of clock synchronization between the terminals.

MODE FOR CARRYING OUT THE INVENTION

Hereinafter, a description will be given of a mode for carrying out the invention (hereinafter, referred to as an "embodiment"). Note that the description is given in the following order.

1. Embodiment
2. Modifications

1. Embodiment

Figure 1:
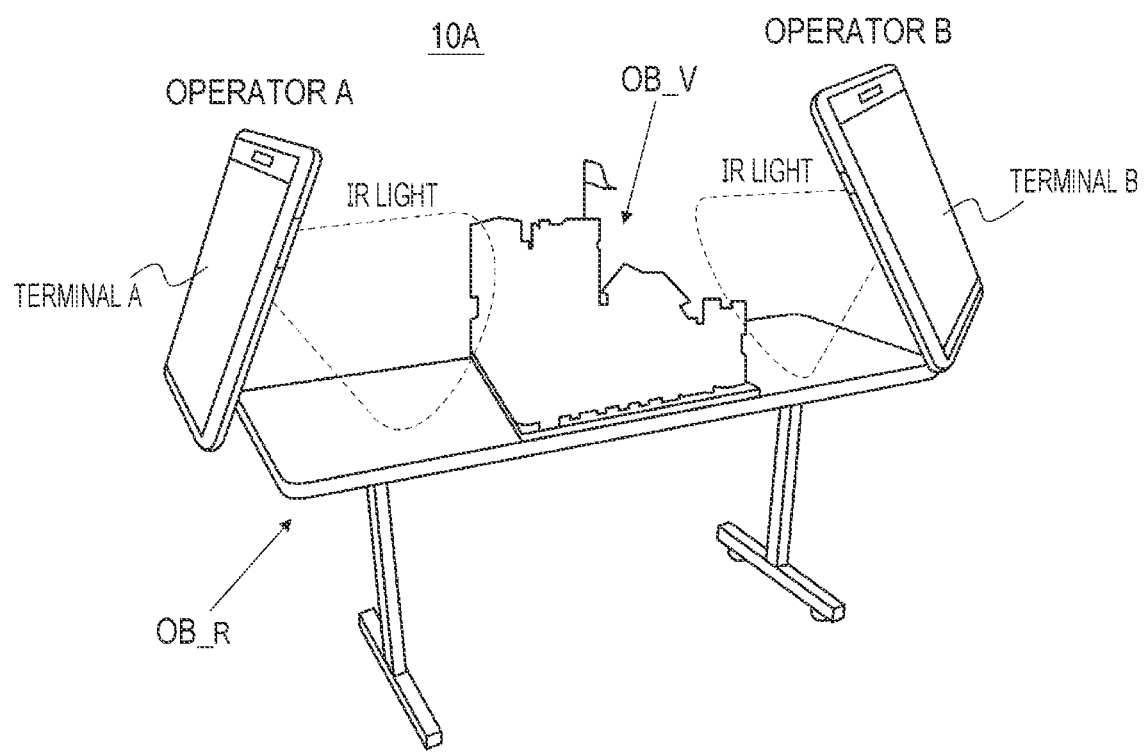
FIG. 1 is a diagram illustrating a configuration example of an AR application system.

[AR Application System]
FIG. 1 illustrates a configuration example of an AR application system 10A. This AR application is a concept including an AR game. The AR application is an application that uses augmented reality (AR) and involves display of an augmented reality space where reality and virtuality are fused.

In the AR application system 10A, the same AR space is shared between terminals A and B as terminals (e.g., a smartphone, a tablet, etc.) of application operators A and B (players in a case of a game). Each of the terminal A and the terminal B has a function of distance measurement to be performed by emitting invisible light, that is, IR light herein. Examples of a distance measurement scheme include ToF, structured light, and the like. It is assumed herein that ToF is adopted.

In sharing the AR space between the terminal A and the terminal B, each terminal performs distance measurement by emitting IR light to acquire depth information of a real space. The depth information in this case is distance information from a self-position to a target environment, that is, a desk in the illustrated example. Each of the terminal A and the terminal B superimposes and displays a virtual object OB_V on a real object OB_R on the basis of the depth information acquired by the distance measurement.

In this case, the display is made in accordance with the target environment. The virtual object OB_V can therefore be superimposed and displayed on the real object OB_R without a sense of incongruity. Note that in the illustrated example, the virtual object OB_V can actually be observed only through each of the terminals A and B.

Figure 2:
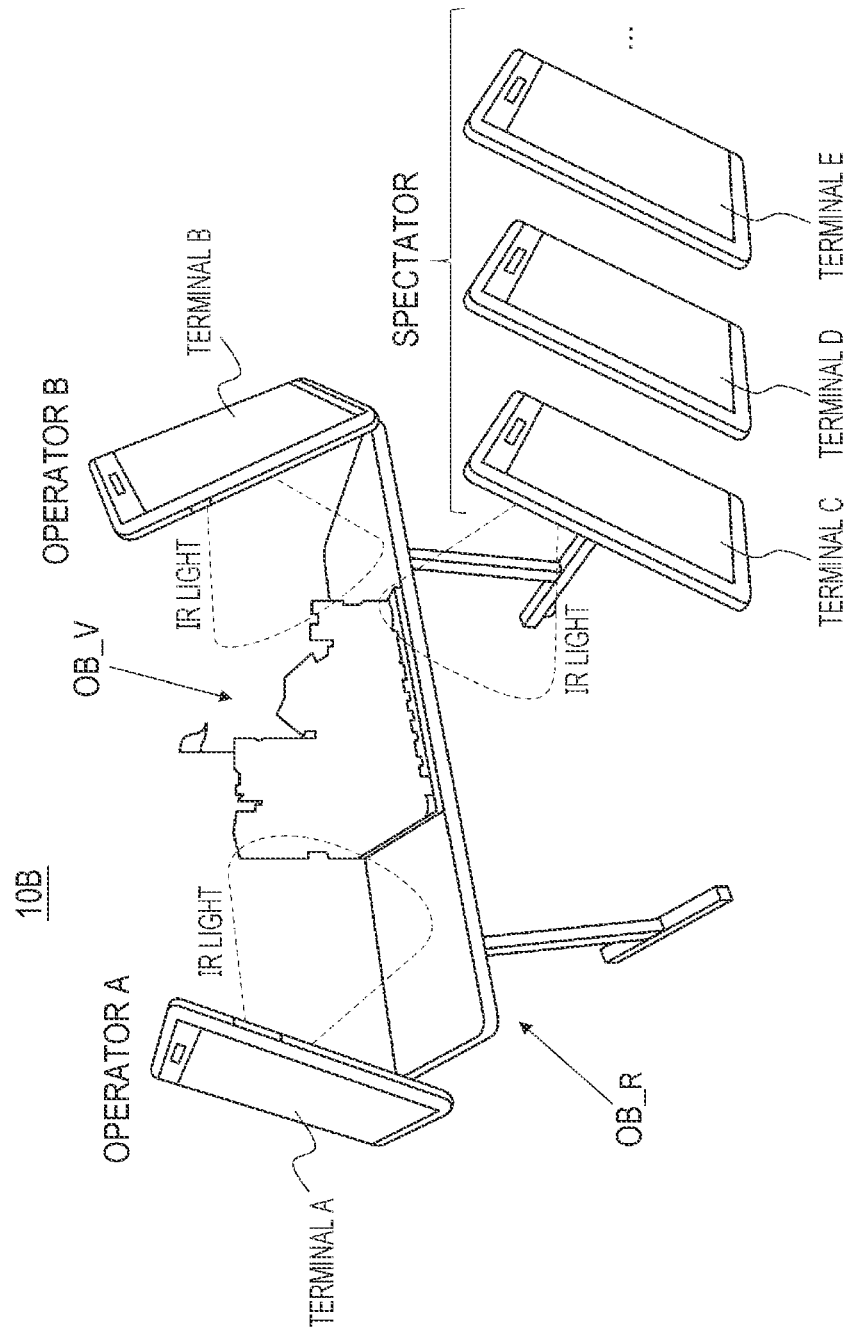
FIG. 2 is a diagram illustrating another configuration example of the AR application system.

FIG. 2 illustrates a configuration example of an AR application system 10B. In the AR application system 10B, the same AR space is shared among terminals A and B as terminals of application operators A and B as well as terminals C, D, E, . . . as terminals of spectators C, D, E, . . . of the AR application.

Each of the terminals, which are similar to the terminals A and B illustrated in FIG. 1, has a function of distance measurement to be performed by emitting IR light. Each of the terminals performs distance measurement by emitting IR light to acquire depth information of a real space (distance information from a self-position to a target environment), and superimposes and displays a virtual object OB_V on a real object OB_R on the basis of the depth information.

[Configuration Example of Terminal]

FIG. 3 illustrates a configuration example of a terminal 100 (the terminal A, the terminal B, the terminal C, the terminal D, the terminal E, . . . ). The terminal 100 includes a bus 110, a control unit 111, a network interface 112, a signal processing unit 113, an input unit 114, a camera 115, a display unit 116, a communication unit 117, a storage unit 118, a ToF distance measurement unit 119, a sensor unit 120, an application processor 121, a speaker 125, and a microphone 126. The control unit 111, the network interface 112, the signal processing unit 113, the input unit 114, the camera 115, the display unit 116, the communication unit 117, the storage unit 118, the ToF distance measurement unit 119, the sensor unit 120, and the application processor 121 are interconnected via the bus 110.

The control unit 111 includes a central processing unit (CPU), a random access memory (RAM), a read only memory (ROM), and the like. The ROM stores a program and the like to be loaded onto and operated by the CPU. The RAM is used as a working memory for the CPU. The CPU executes various processing tasks in accordance with the program stored in the ROM, thereby performing control of the respective components of the terminal 100 and the entire terminal 100.

The network interface 112 performs data exchange with a base station and the like on the basis of, for example, a predetermined protocol. Any communication scheme is usable, such as communication using a wireless local area network (LAN), Wireless Fidelity (Wi-Fi), $4^{th}$ Generation (4G), or $5^{th}$ Generation (5G). By the communication through the network interface 112, the terminal 100 enables a connection to the Internet, a phone call with another person, and the like.

The signal processing unit 113 includes a modulator/demodulator, an AD/DA converter, an audio codec (not illustrated), and the like. In the signal processing unit 113, the modulator/demodulator modulates an audio signal to be transmitted or demodulates a received signal. The signal to be transmitted is converted into a digital signal by the AD/DA converter. The received signal is converted into an analog signal by the AD/DA converter. Then, the speaker 125 from which sound is output and the microphone 126 to which sound is input are connected to the signal processing unit 113.

The input unit 114 is input means through which a user performs various inputs to the terminal 100. For example, the input unit 114 includes a button, a touch panel, a switch, and the like. The input unit 114 may be integrated with the display unit 116 to constitute a touch screen. When the user performs an input operation on the input unit 114, a control signal is generated in accordance with the input and is output to the control unit 111. Then, the control unit 111 performs arithmetic processing and control in accordance with the control signal.

The camera 115 includes a complementary metal oxide semiconductor (CMOS) image sensor and the like, and captures an image of a real space.

The display unit 116 is, for example, display means including a liquid crystal display (LCD), an organic electro luminescence (EL) panel, or the like. The display unit 116 displays a home screen displaying a menu of various operations of the terminal 100 as well as websites, moving image contents, image contents, and the like through the access to the Internet.

The communication unit 117 is a communication module for performing communication with the terminal 100 by a method such as Bluetooth or a USB connection. Examples of a communication method in the communication unit 117 include Bluetooth as a wireless communication method, communication with a USB as a wired communication method, and the like. A Bluetooth module for performing Bluetooth communication is a module capable of data exchange by near field communication according to a Bluetooth scheme. The Bluetooth module achieves data exchange with an external Bluetooth device. In a case of using the USB as the wired communication method for the communication scheme in the communication unit 117, a USB cable achieves data exchange with an external device. Note that "Bluetooth" is a registered trademark.

The storage unit 118 includes a storage medium such as a semiconductor memory. The storage unit 118 stores a program and data for processing tasks to be carried out by the terminal 100. For example, the storage unit 118 temporarily stores image data acquired in such a manner that the camera 115 captures an image, depth information acquired through distance measurement by the ToF distance measurement unit 119, sensor data measured by the sensor unit 120, and the like.

The ToF distance measurement unit 119 includes a ToF sensor, a light emitting diode, an analysis processing unit, and the like. The ToF distance measurement unit 119 performs distance measurement according to a ToF scheme to acquire depth information of a real space. Note that in a case where a structured light scheme is adopted as a distance measurement scheme, the ToF distance measurement unit 119 is replaced with a distance measurement unit having a configuration corresponding to the structured light scheme. This distance measurement unit includes a light emission unit that projects a known pattern having a stripe shape, a grid shape, or the like, an image sensor that captures an image of the known pattern, an analysis processing unit that carries out distance measurement processing on the basis of the captured image, and the like. The distance measurement unit performs distance measurement according to the structured light scheme to acquire depth information of a real space.

The sensor unit 120 is a sensor group that assists recognition of a position and an orientation of the terminal 100. The sensor unit 120 also includes a GPS sensor that receives a GPS signal and measures the latitude, longitude, and altitude of the terminal 100. Furthermore, the sensor unit 120 also includes a gyro sensor that measures a slope angle, an acceleration sensor that measures triaxial acceleration, a geomagnetic sensor that measures an azimuth, or the like.

The application processor 121 is a processing unit that executes various applications including the AR application installed in the terminal 100.

In this embodiment, communication is performed among the respective terminals that participate as an operator or a spectator in the AR application, and the ToF distance measurement units 119 of the respective terminals are controlled on the basis of this communication such that the IR light emission timings do not overlap each other. In this case, the respective terminals that participate as an operator or a spectator in the AR application perform communication for cooperative operation, and this communication can be utilized.

[Model Handling Plurality of Terminals]

There is a server-client model or a peer-to-peer model as a model handling a plurality of terminals. FIG. 4A illustrates an example of a server-client model. In this case, a server (a server) that administers the AR application is separated from a terminal (a client) as a participant in the AR application. In the illustrated example, the terminals A and B are connected from a base station A to the server via a network, and the terminal C is connected from a base station B to the server via the network.

Figure 4B:
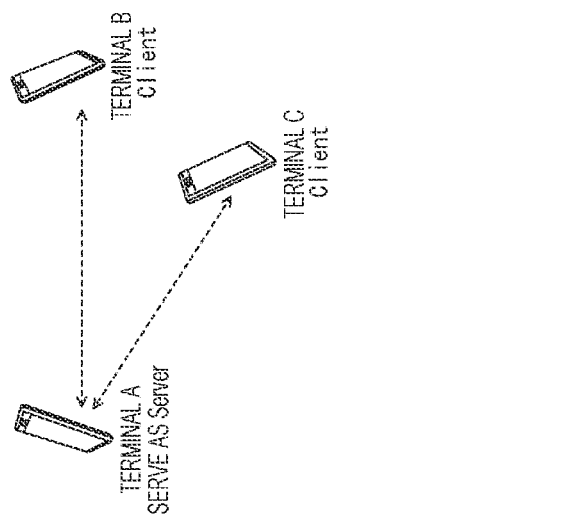
FIGS. 4A and 4B are diagrams for explaining models (a server-client model, a peer-to-peer model) for handling a plurality of terminals.
Figure 4A:
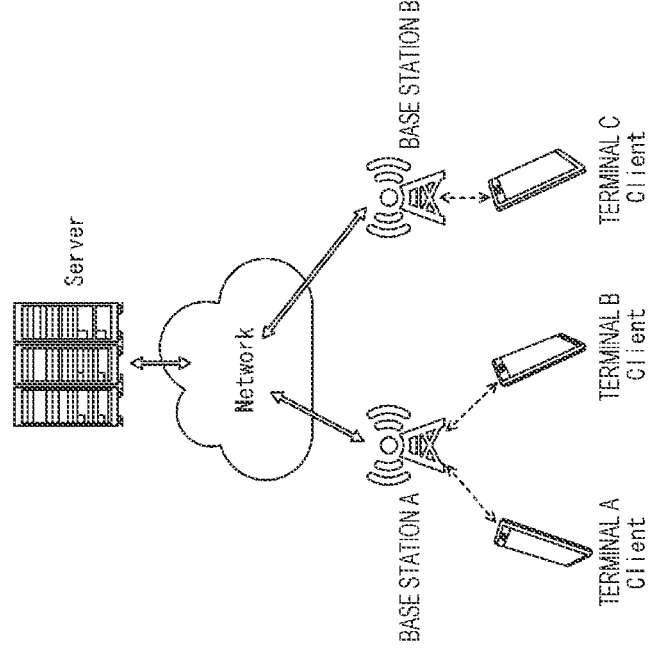

FIG. 4B illustrates an example of a peer-to-peer model. In this case, any one of the terminals serves as the server that administers the AR application. In the illustrated example, the terminal A serves as the server. The terminals B and C are connected as the clients to the terminal A.

The two models described above are equivalent to each other since they are not directly related to the present technology. In the following, a description is given using the peer-to-peer model.

[Timing Adjustment Scheme for Avoiding Overlap Between Emission Timings]

"Token Scheme"

A description will be given of a timing adjustment scheme for avoiding overlap among IR light emission timings of a plurality of terminals. First, a description will be given of a token scheme. Herein, a description will be given, as an example, of a case where the plurality of terminals includes the terminals A and B (see FIG. 1).

In a case where the terminal A commences the AR application and the terminal B participates in the AR application, the terminal A serves as the server and the terminal B serves as the client. The terminal A as the server performs control for adjusting the IR light emission timing of the terminal B as the client for distance measurement, thereby avoiding overlap between the emission timings.

Figure 5:
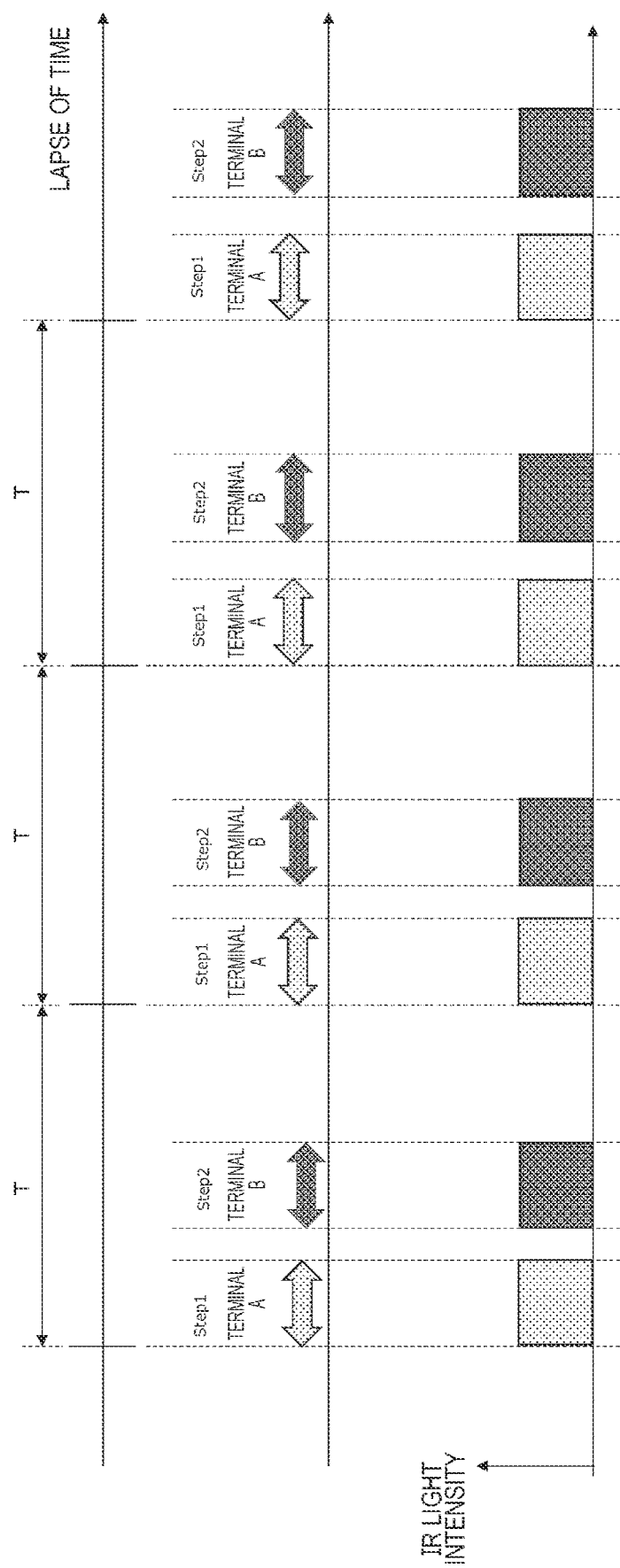
FIG. 5 is a diagram illustrating a specific example of an emission timing according to a token scheme as a timing adjustment scheme.

FIG. 5 illustrates a specific example of an emission timing according to the token scheme. In the illustrated example, "T" represents a cycle associated with an AR application display update rate. This AR application display update rate may be a display frame rate in the display unit 116 or may be a depth information update rate. For example, T is 1/30 seconds when the AR application display update rate is 30 fps.

Figure 6A:
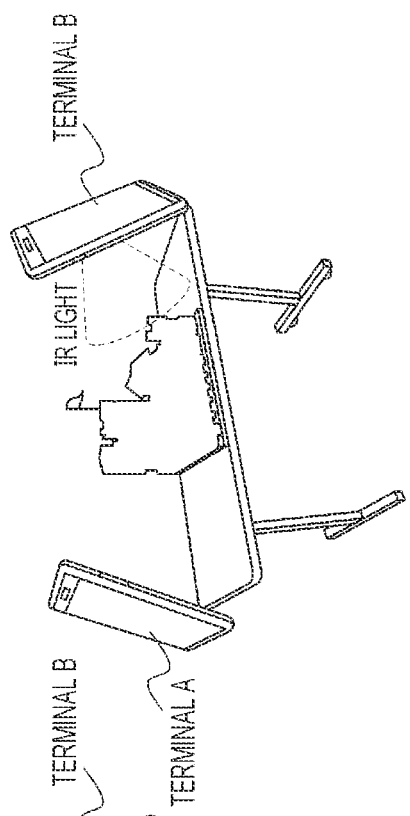
FIGS. 6A and 6B are diagrams illustrating, in the AR application system including terminals A and B, why emission timings of the respective terminals do not overlap each other.

In each cycle, processing of step 1 and processing of step 2 are carried out. A description will be given of the processing of step 1. The terminal A performs distance measurement in such a manner that the ToF distance measurement unit 119 emits IR light (see FIG. 6A). During this time, the terminal B does not perform distance measurement; therefore, the ToF distance measurement unit 119 emits no IR light.

Figure 6B:
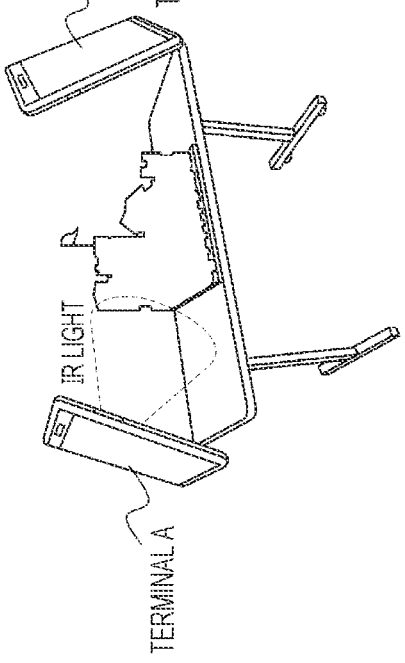

Next, a description will be given of the processing of step 2. Upon completion of the distance measurement, the terminal A stops the IR light emission, and permits the terminal B to perform distance measurement, that is, issues a distance measurement token to the terminal B. When the terminal B receives the distance measurement token, then the terminal B performs distance measurement in such a manner that the ToF distance measurement unit 119 emits IR light (see FIG. 6B). Upon completion of the distance measurement, then, the terminal B returns the distance measurement token to the terminal A. In this case, as illustrated in the figure, the IR light intensity (the IR light emission intensity) of the terminal B is equal to, but is not necessarily equal to, the IR light intensity of the terminal A.

As illustrated in FIG. 5, the processing of step 1 and the processing of step 2 are carried out every cycle T, so that the terminal A and the terminal B perform the distance measurement equally. In one cycle, each terminal performs distance measurement once; therefore, it is possible to prevent wasteful IR light emission in each terminal and to achieve power saving. Herein, a time required for one distance measurement is sufficiently shorter than one cycle T, and each terminal performs distance measurement intermittently.

Note that the example of FIG. 5 shows the case where the client terminal is only the terminal B. In a case where there is a plurality of terminals each serving as a client (see FIG. 2), the terminal A as the server issues a distance measurement token to each of the terminal as the clients in sequence so that each terminal performs distance measurement.

"Synchronization Scheme"

Next, a description will be given of a synchronization scheme. This synchronization scheme is based on the assumption that clock synchronization is established among the terminals.

First, as illustrated in FIG. 7A, a description will be given of a case where all the terminals are connected to the same base station. In the illustrated example, the terminals A and B are connected to the same base station. Each terminal decodes a received signal, using a clock of the same base station. In other words, each terminal is synchronized with the clock of the same base station.

Therefore, in the case where all the terminals are connected to the same base station, the respective terminals are automatically synchronized with the same clock. The use of this synchronized clock enables emission timing control.

Next, as illustrated in FIG. 7B, a description will be given of a case where all the terminals are not connected to the same base station. In the illustrated example, the terminals A and B are connected to different base stations. In this case, clocks among the terminals are set together using a network time protocol (NTP) so that clock synchronization is established with a certain degree of accuracy.

Since all the terminals access the same NTP server, path delays to the NTP server also become almost equal to one another. Therefore, clock synchronization is established with high accuracy as compared with a case of simply using the NTP. The use of this synchronized clock enables emission timing control.

Note that the technique for establishing the clock synchronization among the terminals is not limited to the foregoing example, and other techniques can also be adopted. For example, the clock synchronization among the terminals may be established using a clock synchronization protocol conforming to IEEE 1588.

Figure 8:
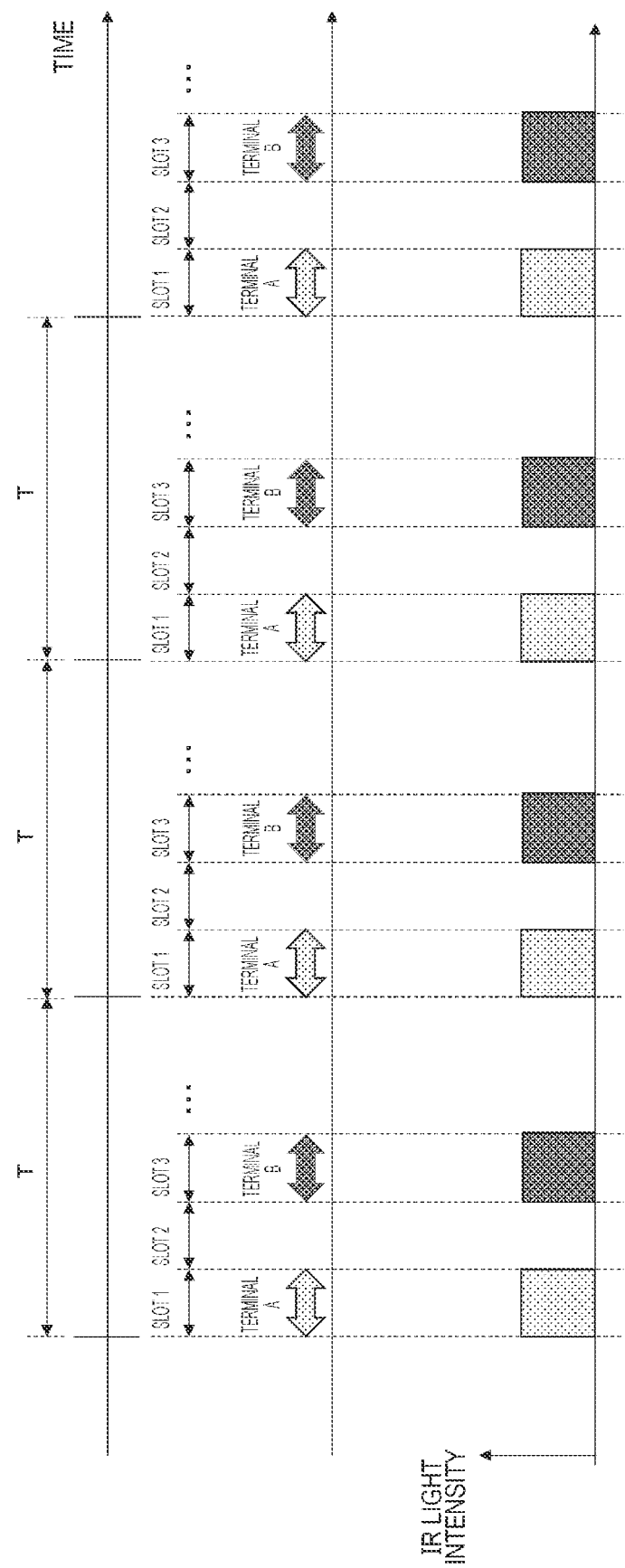
FIG. 8 is a diagram illustrating a specific example of an emission timing according to a synchronization scheme as a timing adjustment scheme.

FIG. 8 illustrates a specific example of an emission timing according to the synchronization scheme. The illustrated example shows the case where the plurality of terminals includes the terminals A and B (see FIG. 1). In the illustrated example, "T" represents a cycle associated with an AR application display update rate. This AR application display update rate may be a display frame rate in the display unit 116 or may be a depth information update rate. For example, T is ⅓₀ seconds when the AR application display update rate is 30 fps.

In a case where the terminal A commences the AR application and the terminal B participates in the AR application, the terminal A serves as the server and the terminal B serves as the client. The terminal A as the server performs control for adjusting the IR light emission timing of the terminal B as the client for distance measurement, thereby avoiding overlap between the emission timings. The terminal A transmits, to the terminal B, information indicating assignment of a time slot. In this case, a slot (a phase) is set for determining an emission timing in each cycle, and each terminal is controlled to emit IR light in the determined slot.

On the assumption that the synchronization between the terminal A and the terminal B is established, the terminal A sets an IR light emission slot (a phase) for performing distance measurement, and the terminal B sets an IR light emission slot, which does not overlap the slot, for performing distance measurement. In the illustrated example, the slot corresponding to the IR light emission timing of the terminal A is set at slot 1, and the slot corresponding to the IR light emission timing of the terminal B is set at slot 3. As a matter of course, a slot to be set is not limited thereto.

In each cycle, each terminal performs distance measurement by emitting IR light in the set slot. That is, in slot 1, the terminal A performs distance measurement in such a manner that the ToF distance measurement unit 119 emits IR light (see FIG. 6A). Furthermore, in slot 3, the terminal B performs distance measurement in such a manner that the ToF distance measurement unit 119 emits IR light (see FIG. 6B). In this case, as illustrated in the figure, the IR light intensity (the IR light emission intensity) of the terminal B is equal to, but is not necessarily equal to, the IR light intensity of the terminal A.

As illustrated in FIG. 8, the terminals A and B respectively perform distance measurement in slots 1 and 3 every cycle T, so that the terminal A and the terminal B perform the distance measurement equally. In one cycle, each terminal performs distance measurement once; therefore, it is possible to prevent wasteful IR light emission in each apparatus and to achieve power saving. Herein, a time required for one distance measurement is sufficiently shorter than one cycle T, and each terminal performs distance measurement intermittently.

Figure 9:
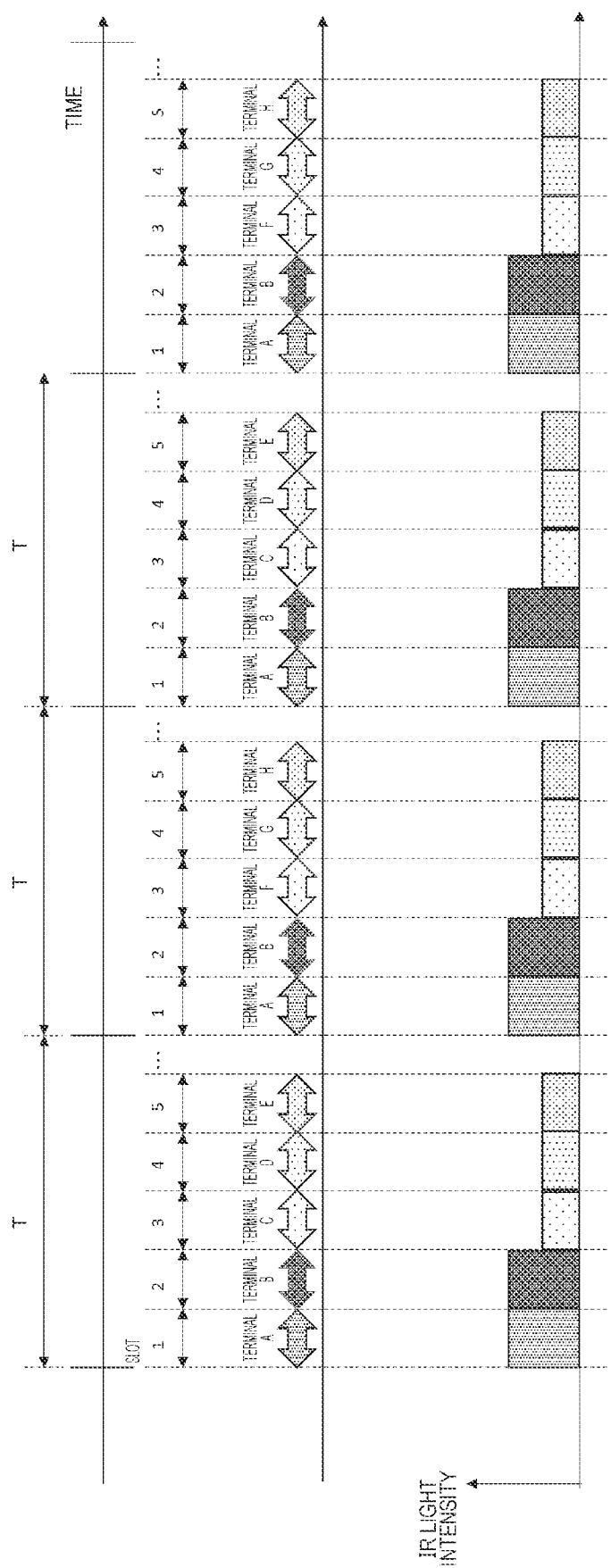
FIG. 9 is a diagram illustrating another specific example of the emission timing according to the synchronization scheme as a timing adjustment scheme.

FIG. 9 illustrates another specific example of the emission timing according to the synchronization scheme. The illustrated example shows a case where the plurality of terminals includes the terminals A and B of the application operators A and B as well as the terminals C, D, E, F, G, and H of the spectators C, D, E, F, G, and H (see FIG. 2).

In the illustrated example which is similar to the example illustrated in FIG. 8, "T" represents a cycle associated with an AR application display update rate in each of the terminals A and B. Note that in the illustrated example, an AR application display update rate in each of the terminals C, D, E, F, G, and H is defined as 2T. It is assumed herein that operator's terminals A and B each have a higher priority and the spectator's terminals C to H each have a lower priority.

In a case where the terminal A commences the AR application and the terminals B to H each participate in the AR application, the terminal A serves as the server and the terminals B to H each serve as the client. Here, the terminal B participates as the operator in the AR application, and each of the terminals C to H participates as the spectator in the AR application.

The terminal A as the server performs control for adjusting the IR light emission timing of each of the terminals B to H as the clients for distance measurement, thereby avoiding overlap among the emission timings. The terminal A transmits, to each of the terminals B to H, information indicating assignment of a time slot. In this case, a slot (a phase) is set for determining an emission timing in each cycle, and each terminal is controlled to emit IR light in the determined slot.

On the assumption that the synchronization among the terminals A to H is established, the terminal A sets an IR light emission slot (a phase) for performing distance measurement, and each of the terminals B to H sets an IR light emission slot, which does not overlap the slot, for performing distance measurement. In the illustrated example, the slots corresponding to the IR light emission timings of the terminals A and B each having the higher priority are set at slots 1 and 2, respectively, in each cycle.

Furthermore, in the illustrated example, the slots corresponding to the IR light emission timings of the terminals C, D, and E each having the lower priority are set at slots 3, 4, and 5, respectively, every one cycle, and the slots corresponding to the IR light emission timings of the terminals F, G, and H each having the lower priority are also set at slots 3, 4, and 5, respectively, every one cycle. As a matter of course, a slot to be set is not limited thereto.

In each cycle, each terminal performs distance measurement by emitting IR light in the set slot. That is, in slot 1 of each cycle, the terminal A performs distance measurement in such a manner that the ToF distance measurement unit 119 emits IR light (see FIG. 10A). Furthermore, in slot 2 of each slot, the terminal B performs distance measurement in such a manner that the ToF distance measurement unit 119 emits IR light (see FIG. 10B).

Figure 10:
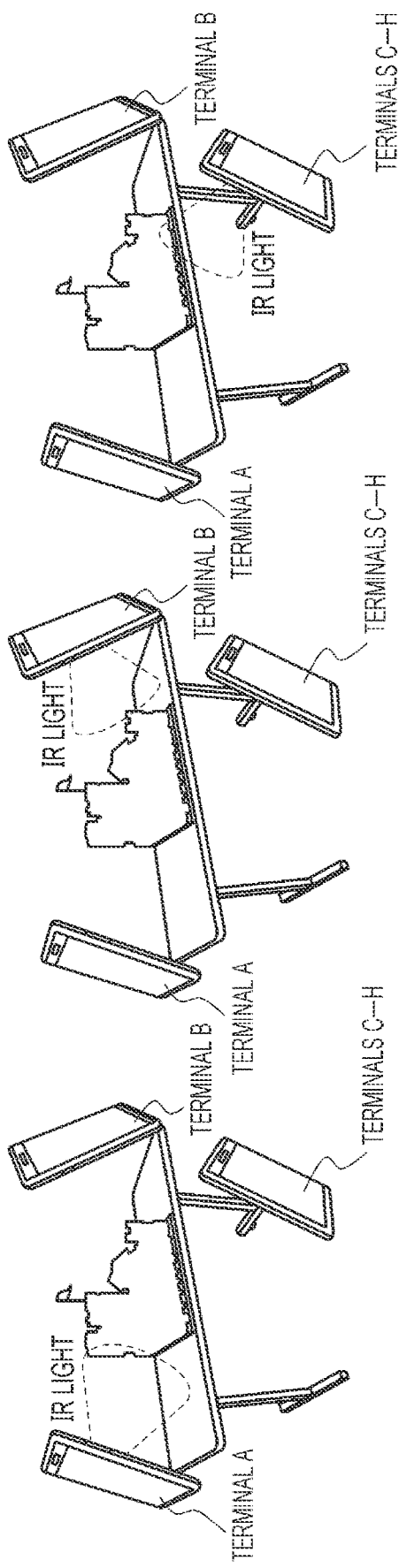
FIGS. 10A, 10B and 10C are diagrams illustrating, in the AR application system further including terminals C to H in addition to the terminals A and B, why emission timings of the respective terminals do not overlap one another.

Furthermore, in each of the consecutive two cycles, the terminals C, D, and E perform distance measurement in such a manner that the ToF distance measurement units 119 emit rays of IR light in slots 3, 4, and 5 of the first cycle, and the terminals F, G, and H perform distance measurement in such a manner that the ToF distance measurement units 119 emit rays of IR light in slots 3, 4, and 5 of the subsequent cycle (see FIG. 10C). It is possible to increase the number of terminals sharing the AR space in such a manner that the terminals C to H each having the lower priority are made lower in light emission rate (distance measurement rate) than the terminals A and B each having the higher priority in this way.t necessarily equal to, the IR light intensity of the terminal A.

Furthermore, in this case, the terminals C to H each having the lower priority may be made lower in IR light intensity (IR light emission intensity) than the terminals A and B each having the higher priority. With this configuration, it is possible to reduce an influence which IR light emitted from the terminal having the lower priority exerts on light emitted from the terminal having the higher priority.

Whether the token scheme is adopted or the synchronization scheme is adopted as a timing adjustment scheme for avoiding overlap among emission timings can be determined on the basis of, for example, the number of participants in the AR application. For example, the token scheme is adopted in a case where the number of participants is equal to or less than a predetermined number, and the synchronization scheme is adopted in a case where the number of participants is more than the predetermined number. In the case of the synchronization scheme, a time for transmission of a token is unnecessary, which accordingly increases a time usable for light emission. The synchronization scheme is therefore suitable in a case where the number of participants is large. In the case of the token scheme, on the other hand, it is unnecessary to carry out processing of clock synchronization among the apparatuses.

With reference to flowcharts of FIGS. 11 to 14, a description will be given of processing to be carried out by the AR application system 10A illustrated in FIG. 1 and processing to be carried out by the AR application system 10B illustrated in FIG. 2.

Figure 11:
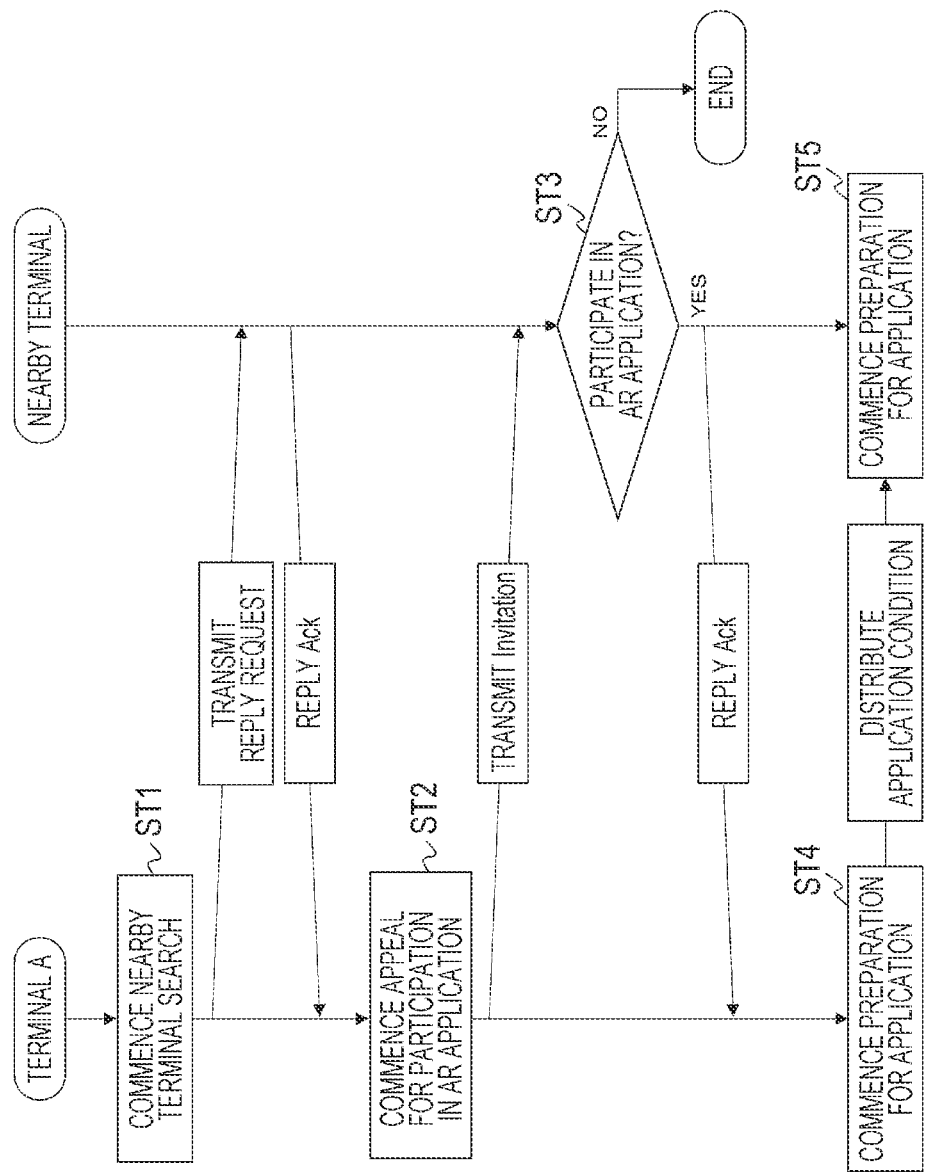
FIG. 11 is a flowchart illustrating processing by each terminal before commencement of application preparation.

The flowchart of FIG. 11 illustrates processing by each terminal before commencement of application preparation. In step ST1, the terminal A as the server commences a nearby terminal search. In this case, the terminal A transmits a reply request, and a nearby terminal replies an acknowledgement (Ack) to the terminal A in response to the reply request.

In step ST2, next, the terminal A commences an appeal for participation in the AR application. In this case, the terminal A transmits an invitation to the nearby terminal which has replied the acknowledgement.

In step ST3, the nearby terminal which has received the invitation determines whether or not to participate in the AR application, in response to the invitation. In this case, in a case of participating in the AR application, the nearby terminal determines whether to participate as an operator (a player in a case of an AR game) or participate as a spectator. The nearby terminal then replies to the terminal A the acknowledgement (Ack) together with participation mode determination information. On the other hand, in a case of not participating in the AR application, the nearby terminal terminates the operation.

In step ST4, the terminal A which has received the acknowledgement together with the participation mode determination information from the nearby terminal commences preparation for the AR application. In step ST5, furthermore, the nearby terminal that participates in the AR application commences preparation for the AR application. In this case, the terminal A distributes an application condition (information regarding the application) to the nearby terminal that participates in the AR application.

This application condition includes information regarding an AR application display update rate, information indicating a timing adjustment scheme, information indicating a priority of a terminal (a nearby terminal) regarding the AR application, and the like.

For example, the information regarding the AR application display update rate is, for example, an AR application display frame rate or an AR application depth information update rate. Furthermore, the information indicating the timing adjustment scheme is information indicating whether the timing adjustment scheme is the token scheme or the synchronization scheme. As described above, whether the token scheme is adopted or the synchronization scheme is adopted can be determined on the basis of, for example, the number of participants in the AR application. The number of participants can be calculated from, for example, the acknowledgement received at the time in step ST4 described above. Note that the token scheme or synchronization scheme, which has been determined on the basis of the number of participants as described above, may be transmitted while being contained in the information regarding the AR application display update rate. Furthermore, the information indicating the priority of the terminal (the nearby terminal) regarding the AR application indicates a higher priority as to the nearby terminal that participates as the operator in the AR application and indicates a lower priority as to the nearby terminal that participates as the spectator in the AR application. For example, the information indicating the priorities is information indicating whether the operator or the spectator of the AR application.

Figure 12:
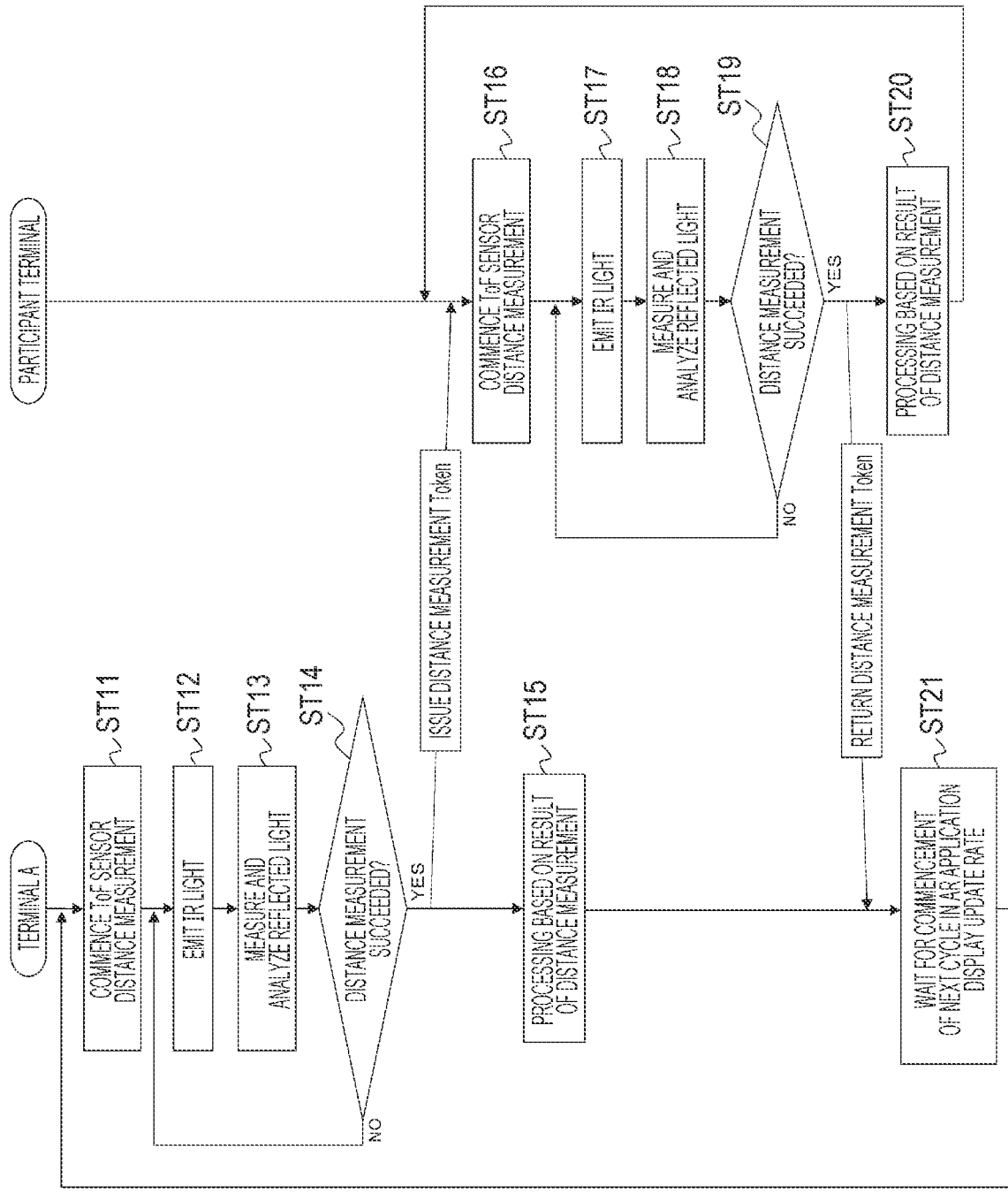
FIG. 12 is a flowchart illustrating an example of distance measurement processing by each terminal in a case where the token scheme is determined as a timing adjustment scheme.

The flowchart of FIG. 12 illustrates an example of distance measurement processing by each terminal in a case where the token scheme is determined as a timing adjustment scheme. Note that this example shows a case where the number of participant terminals is one (a case where only the terminal B participates as illustrated in FIG. 1).

In step ST11, the terminal A as the server commences distance measurement (ToF sensor distance measurement) by the ToF distance measurement unit 119. In step ST12, then, the terminal A emits IR light. In step ST13, the terminal A performs measurement and analysis on the reflected light. In step ST14, the terminal A determines whether or not the distance measurement has succeeded. When the distance measurement has not succeeded, the terminal A returns to step ST12 and repeats similar processing tasks to those described above.

When the distance measurement has succeeded, in step ST15, the terminal A carries out processing based on a result of the distance measurement. This processing includes display of an augmented reality space in the AR application. In the example illustrated in FIG. 1, for example, the terminal A carries out the processing of superimposing and displaying the virtual object OB_V on the real object OB_R on the basis of the depth information of the real space (the distance information from the self-position to the target environment) acquired through the distance measurement.

Furthermore, when the distance measurement has succeeded, the terminal A issues a distance measurement token to the participant terminal. In step ST16, the participant terminal commences distance measurement (ToF sensor distance measurement) by the ToF distance measurement unit 119. In step ST17, then, the participant terminal emits IR light. In step ST18, the participant terminal performs measurement and analysis on the reflected light. In step ST19, the participant terminal determines whether or not the distance measurement has succeeded. When the distance measurement has not succeeded, the participant terminal returns to step ST17 and repeats similar processing tasks to those described above.

When the distance measurement has succeeded, in step ST20, the participant terminal carries out processing based on a result of the distance measurement. This processing includes display of an augmented reality space in the AR application. In the example illustrated in FIG. 1, for example, the participant terminal carries out the processing of superimposing and displaying the virtual object OB_V on the real object OB_R on the basis of the depth information of the real space (the distance information from the self-position to the target environment) acquired through the distance measurement.

After the processing task in step ST20, the participant terminal receives a new distance measurement token created by the terminal A. Then, the participant terminal returns to step ST16 and repeats similar processing tasks to those described above.

Furthermore, when the distance measurement has succeeded, the participant terminal returns the distance measurement token to the terminal A. In step ST21, the terminal A waits for commencement of the next cycle in the AR application display update rate. Thereafter, the terminal A returns to the processing task in step ST11 and repeats similar processing tasks to those described above. Note that when the participant terminal does not return the foregoing distance measurement token to the terminal A, that is, when the terminal A does not receive the distance measurement token from the participant terminal, the terminal A determines that the distance measurement by the participant terminal has failed, waits for a predetermined timing (a display rate update timing), and returns to the processing task in step ST11.

Note that in the foregoing description, the distance measurement token is transmitted solely; however, the distance measurement token may be transmitted solely or may be transmitted while being contained in information to be shared regularly or irregularly among AR applications. Furthermore, as described above, the example of the distance measurement processing in FIG. 12 shows the case where the number of participant terminals is one. In a case where there is a plurality of participant terminals (in a case where the terminals C, D, E, . . . , and the like also participate in addition to the terminal B as illustrated in FIG. 2), issuance of a distance measurement token by the terminal A, processing tasks in steps ST16 to ST20 by the participant terminal associated with the issuance, and return of a distance measurement token associated with the issuance are repeated by the number of participant terminals.

Figure 13:
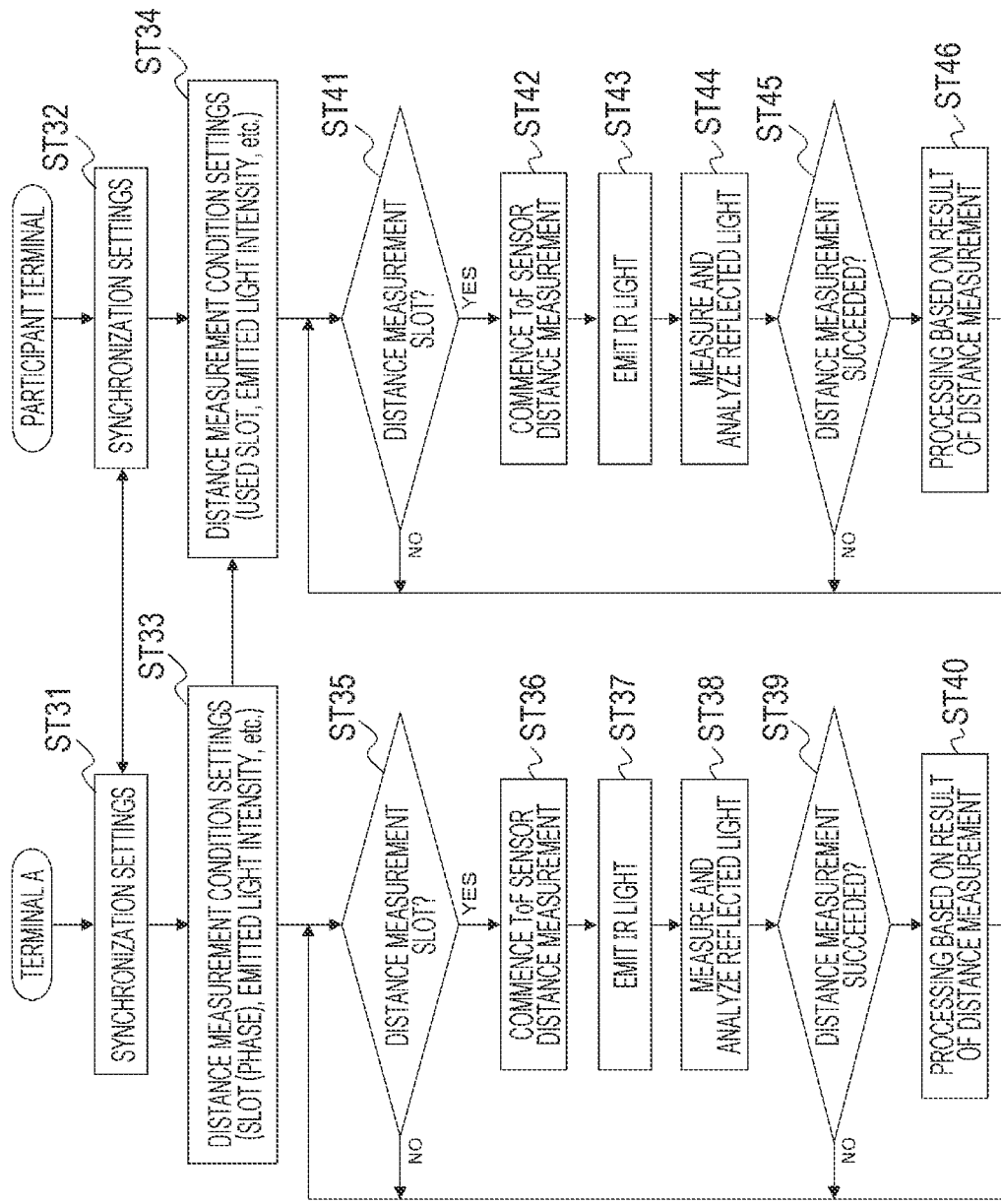
FIG. 13 is a flowchart illustrating an example of distance measurement processing by each terminal in a case where the synchronization scheme is determined as a timing adjustment scheme.

The flowchart of FIG. 13 illustrates an example of distance measurement processing by each terminal in a case where the synchronization scheme is determined as a timing adjustment scheme. Note that this example shows a case where the number of participant terminals is one (a case where only the terminal B participates as illustrated in FIG. 1).

In step ST31, the terminal A as the server performs synchronization settings. In step ST32, the participant terminal performs synchronization settings.

Figure 14:
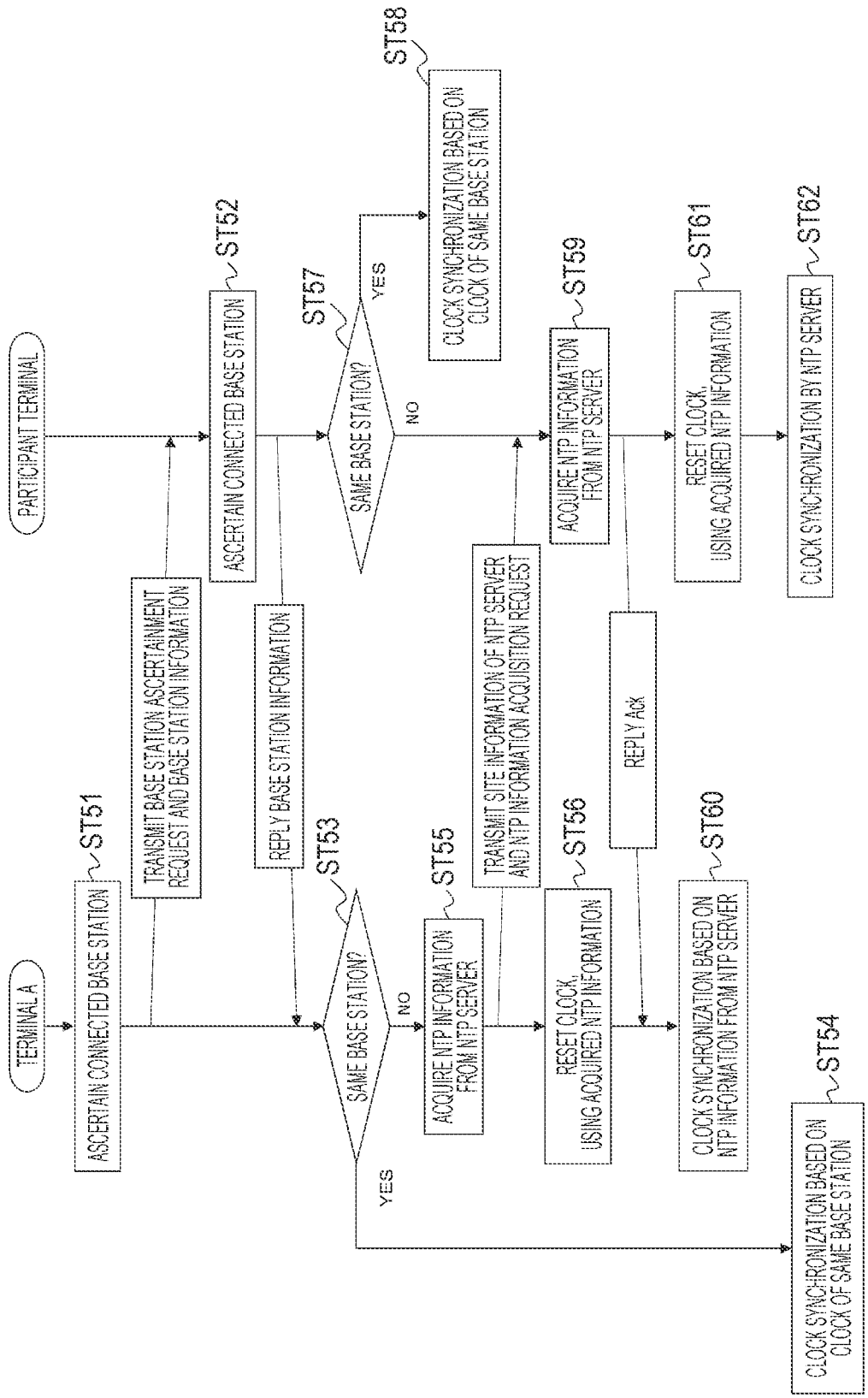
FIG. 14 is a flowchart illustrating an example of synchronization setting processing by each terminal in the case where the synchronization scheme is determined as a timing adjustment scheme.

The flowchart of FIG. 14 illustrates an example of synchronization setting processing by each terminal. In step ST51, the terminal A ascertains a base station to which the terminal A is connected. Then, the terminal A transmits, to the participant terminal, a base station ascertainment request and information of the base station to which the terminal A is connected. In step ST52, the participant terminal ascertains a base station to which the participant terminal is connected. Then, the participant terminal transmits, to the terminal A, information of the base station to which the participant terminal is connected.

In step ST53, the terminal A determines whether or not the base station to which the terminal A is connected is identical with the base station to which the participant terminal is connected. When the base station to which the terminal A is connected is identical with the base station to which the participant terminal is connected, in step ST54, the terminal A ascertains that the terminal A and the participant terminal are subjected to clock synchronization with the clock of the same base station (see FIG. 7A).

When the base station to which the terminal A is connected is not identical with the base station to which the participant terminal is connected, in step ST55, the terminal A accesses a predetermined NTP server to acquire NTP information. In step ST56, then, the terminal A resets the clock thereof or at least timing information related to the AR display, using the acquired NTP information. Furthermore, the terminal A transmits, to the participant terminal, site information of the NTP server and an NTP information acquisition request.

After the processing task in step ST52, in step ST57, the participant terminal determines whether or not the base station to which the participant terminal is connected is identical with the base station to which the terminal A is connected. When the base station to which the participant terminal is connected is identical with the base station to which the terminal A is connected, in step ST58, the participant terminal ascertains that the participant terminal and the terminal A are subjected to clock synchronization with the clock of the same base station (see FIG. 7A).

When the base station to which the participant terminal is connected is not identical with the base station to which the terminal A is connected, in step ST59, the participant terminal accesses the NTP server which the terminal A has accessed, to acquire NTP information on the basis of the site information of the NTP server transmitted from the terminal A. Then, the participant terminal replies the acknowledgement (Ack) to the terminal A. Thus, in step ST60, the terminal A ascertains that the terminal A and the participant terminal are subjected to clock synchronization based on the NTP information from the NTP server (see FIG. 7B).

Furthermore, in step ST61, the participant terminal which has acquired the NTP information from the NTP server resets the clock thereof, using the acquired NTP information. In step ST62, then, the participant terminal ascertains that the participant terminal and the terminal A are subjected to clock synchronization based on the NTP information from the NTP server (see FIG. 7B).

Note that in the synchronization setting processing illustrated in FIG. 14, the terminal A determines whether or not the base station to which the terminal A is connected is identical with the base station to which the participant terminal is connected, and the participant terminal also determines whether or not the base station to which the participant terminal is connected is identical with the base station to which the terminal A is connected. It is also conceivable that, for example, only the terminal A determines whether or not the base station to which the terminal A is connected is identical with the base station to which the participant terminal is connected, and transmits a result of the determination to the participant terminal for use. Furthermore, on the contrary, it is also conceivable that, for example, only the participant terminal determines whether or not the base station to which the participant terminal is connected is identical with the base station to which the terminal A is connected, and transmits a result of the determination to the terminal A for use.

Referring back to FIG. 13, after the synchronization setting processing, in step ST33, the terminal A performs distance measurement condition settings. In step ST34, the participant terminal performs distance measurement condition settings. At this time, the terminal A transmits a distance measurement condition to the participant terminal. The distance measurement condition includes information of a slot (a phase) indicating a timing at which the participant terminal performs IR light emission to perform distance measurement, the intensity of the light emitted at this time, and the like.

After the distance measurement condition setting processing, in step ST35, the terminal A determines whether or not the slot is the distance measurement slot thereof. Then, when the slot is the distance measurement slot of the terminal A, in step ST36, the terminal A commences distance measurement (ToF sensor distance measurement) by the ToF distance measurement unit 119. In step ST37, the terminal A emits IR light. In step ST38, the terminal A performs measurement and analysis of the reflected light. In step ST39, the terminal A determines whether or not the distance measurement has succeeded.

When the distance measurement has not succeeded, the terminal A returns to the processing task in step ST35. When the distance measurement has succeeded, in step ST40, the terminal A carries out processing based on a result of the distance measurement, and then returns to the processing task in step ST35. This processing based on the result of the distance measurement includes display of an augmented reality space in the AR application. In the example illustrated in FIG. 1, for example, the terminal A carries out the processing of superimposing and displaying the virtual object OB_V on the real object OB_R on the basis of the depth information of the real space (the distance information from the self-position to the target environment) acquired through the distance measurement.

Furthermore, after the distance measurement condition setting processing, in step ST41, the participant terminal determines whether or not the slot is the distance measurement slot thereof. Then, when the slot is the distance measurement slot of the participant terminal, in step ST42, the participant terminal commences distance measurement (ToF sensor distance measurement) by the ToF distance measurement unit 119. In step ST43, the participant terminal emits IR light. In step ST44, the participant terminal performs measurement and analysis of the reflected light. In step ST45, the participant terminal determines whether or not the distance measurement has succeeded.

When the distance measurement has not succeeded, the participant terminal returns to the processing task in step ST41. When the distance measurement has succeeded, in step ST46, the participant terminal carries out processing based on a result of the distance measurement, and then returns to the processing task in step ST41. This processing based on the result of the distance measurement includes display of an augmented reality space in the AR application. In the example illustrated in FIG. 1, for example, the participant terminal carries out the processing of superimposing and displaying the virtual object OB_V on the real object OB_R on the basis of the depth information of the real space (the distance information from the self-position to the target environment) acquired through the distance measurement.

Note that, as described above, the example of the distance measurement processing in FIG. 13 shows the case where the number of participant terminals is one. In a case where there is a plurality of participant terminals (in a case where the terminals C, D, E, . . . , and the like also participate in addition to the terminal B as illustrated in FIG. 2), the participant terminals in FIG. 13 are present in parallel by the number of participant terminals.

As described above, the AR application systems 10A and 10B illustrated in FIGS. 1 and 2 are controlled or adjusted such that IR light emission timings for distance measurement by the respective terminals sharing the AR space do not overlap each other. It is therefore possible to avoid interference of rays of emitted IR light and it is accordingly possible to prevent decrease in accuracy of depth information acquired through distance measurement.

2. Modifications

Note that the foregoing embodiment exemplifies the present technology applied to each of the AR application systems 10A and 10B; however, an applicable range of the present technology is not limited thereto. For example, the present technology is also applicable to a case where a plurality of terminals captures an image of the same subject. In such a case, the present technology achieves distance measurement with high accuracy and enables depth control.

Furthermore, preferred embodiments of the present disclosure have been described in detail with reference to the accompanying drawings; however, the technical scope of the present disclosure is not limited to such examples. It is evident that a person having ordinary knowledge in the technical field of the present disclosure is able to conceive various changes or modifications within the scope of the technical idea as defined in the appended claims, and it is to be understood that such changes or modifications may also fall within the technical scope of the present disclosure.

In addition, the advantageous effects described in the present specification are merely descriptive or illustrative but not limitative. That is, the technology related to the present disclosure may produce other advantageous effects apparent to those skilled in the art from the description of the present specification, in addition to the foregoing advantageous effects or in place of the foregoing advantageous effects.

Note that the present technology can also adopt the following configurations.

(1) An information processing apparatus including:
a first light emission unit configured to perform light emission of invisible light for performing distance measurement;
a first acquisition unit configured to acquire depth information of a real space on the basis of the light emission by the first light emission unit;
a control unit configured to control the light emission by the first light emission unit; and
a communication unit configured to perform communication with another information processing apparatus including a second light emission unit configured to perform light emission of invisible light for performing distance measurement and a second acquisition unit configured to acquire depth information of a real space on the basis of the light emission by the second light emission unit,
in which
the control unit performs control causing the first light emission unit to perform the light emission at a timing not overlapping a light emission timing of the second light emission unit, on the basis of the communication with the other information processing apparatus through the communication unit.

(2) The information processing apparatus as recited in (1), in which
the control unit controls processing of an application that performs display of a first augmented reality space, on the basis of the depth information acquired by the first acquisition unit, and
the other information processing apparatus performs control of an application that performs display of a second augmented reality space including at least a part of the first augmented reality space, on the basis of the depth information acquired by the second acquisition unit.

(3) The information processing apparatus as recited in (2), in which
the communication unit transmits information regarding the application to the other information processing apparatus, and
the control unit causes the first light emission unit to perform the light emission on the basis of the information regarding the application.

(4) The information processing apparatus as recited in (3), in which
the information regarding the application contains information regarding an application display update rate.

(5) The information processing apparatus as recited in (4), in which
the other information processing apparatus causes the second light emission unit to perform the light emission once in one cycle of the application display update rate, and
the control unit causes the first light emission unit to perform the light emission once at a timing not overlapping the light emission timing of the second light emission unit, in one cycle of the application display update rate.

(6) The information processing apparatus as recited in (4) or (5), in which
the information regarding the application display update rate is an application display frame rate.

(7) The information processing apparatus as recited in (4) or (5), in which
the information regarding the application display update rate is an application depth information update rate.

(8) The information processing apparatus as recited in any of (3) to (7), in which
the information regarding the application contains information indicating a timing adjustment scheme.

(9) The information processing apparatus as recited in (8), in which
the timing adjustment scheme is a token scheme.

(10) The information processing apparatus as recited in (9), in which
in a case where issuance of a token is made a round, the control unit performs control such that the issuance of the token is waited until a next application display update timing.

(11) The information processing apparatus as recited in (8), in which
the timing adjustment scheme is a synchronization scheme.

(12) The information processing apparatus as recited in (11), in which
the communication unit transmits information indicating assignment of a time slot to the other information processing apparatus.

(13) The information processing apparatus as recited in any of (8) to (12), in which
the timing adjustment scheme is determined on the basis of a number of participants in the application.

(14) The information processing apparatus as recited in (13), in which
the control unit adopts a token scheme in a case where the number of participants is equal to or less than a predetermined number, and adopts a synchronization scheme in a case where the number of participants is more than the predetermined number.

(15) The information processing apparatus as recited in any of (3) to (14), in which
the information regarding the application contains information indicating priorities of information processing apparatuses regarding the application.

(16) The information processing apparatus as recited in (15), in which
the information processing apparatus having the lower priority is controlled to be lower in light emission rate than the information processing apparatus having the higher priority.

(17) The information processing apparatus as recited in (15) or (16), in which
the information processing apparatus having the lower priority is controlled to be lower in light emission intensity than the information processing apparatus having the higher priority.

(18) The information processing apparatus as recited in any of (15) to (17), in which
the information indicating the priorities is information indicating whether an operator or a spectator of the application.

(19) The information processing apparatus as recited in any of (1) to (18), in which
a scheme for the distance measurement is ToF or structured light.

(20) A control method for controlling an information processing apparatus including
a first light emission unit configured to perform light emission of invisible light for performing distance measurement,
a first acquisition unit configured to acquire depth information of a real space on the basis of the light emission by the first light emission unit, and
a communication unit configured to perform communication with another information processing apparatus including a second light emission unit configured to perform light emission of invisible light for performing distance measurement and a second acquisition unit configured to acquire depth information of a real space on the basis of the light emission by the second light emission unit,
the control method including
performing control causing the first light emission unit to perform the light emission at a timing not overlapping a light emission timing of the second light emission unit, on the basis of the communication with the other information processing apparatus.

REFERENCE SIGNS LIST

10A, 10B AR application system
100 Terminal
110 Bus
111 Control unit
112 Network interface 113 Signal processing unit
114 Input unit
115 Camera
116 Display unit
117 Communication unit
118 Storage unit
119 ToF distance measurement unit
120 Sensor unit
121 Application processor
125 Speaker
126 Microphone

The invention claimed is:

1. A first information processing apparatus, comprising:
first light emission circuitry configured to execute first light emission of first invisible light for distance measurement; and
a central processing unit (CPU) configured to:
control acquisition of first depth information of a real space based on the first light emission;
control an application based on the first depth information, wherein the application executes display of a first augmented reality space;
transmit information regarding the application to a second information processing apparatus, wherein
the information regarding the application includes information regarding an application display update rate,
the second information processing apparatus includes second light emission circuitry,
the second light emission circuitry executes, based on the information regarding the application, second light emission of second invisible light for distance measurement, and the second information processing apparatus acquires second depth information of the real space based on the second light emission; and
control the first light emission circuitry to execute the first light emission once at a first light emission timing different from a second light emission timing of the second light emission of the second light emission circuitry, wherein the first light emission circuitry is controlled to execute the first light emission once in one cycle of the application display update rate.

2. The first information processing apparatus according to claim 1, wherein
the second information processing apparatus controls the application based on the second depth information, and
the application executes, for the second information processing apparatus, display of a second augmented reality space including at least a part of the first augmented reality space.

3. The first information processing apparatus according to claim 2, wherein
the second information processing apparatus controls the second light emission circuitry to execute the second light emission once in the one cycle of the application display update rate, and
the first light emission timing does not overlap with the second light emission timing of the second light emission circuitry.

4. The first information processing apparatus according to claim 2, wherein the information regarding the application contains information indicating a timing adjustment scheme.

5. The first information processing apparatus according to claim 4, wherein the timing adjustment scheme comprises a token scheme.

6. The first information processing apparatus according to claim 5, wherein in a case where issuance of a token is made a round, the CPU is further configured to execute control such that the issuance of the token is waited until a next application display update timing.

7. The first information processing apparatus according to claim 4, wherein the timing adjustment scheme comprises a synchronization scheme.

8. The first information processing apparatus according to claim 7, wherein the CPU is further configured to transmit information that indicates assignment of a time slot to the second information processing apparatus.

9. The first information processing apparatus according to claim 4, wherein the CPU is further configured to determine the timing adjustment scheme based on a number of participants in the application.

10. The first information processing apparatus according to claim 9, wherein the CPU is further configured to:
determine a token scheme as the timing adjustment scheme in a case where the number of participants is one of equal to or less than a specific number; and
determine a synchronization scheme as the timing adjustment scheme in a case where the number of participants is more than the specific number.

11. The first information processing apparatus according to claim 2, wherein
the information regarding the application contains information indicating a priority of each information processing apparatus of a plurality of information processing apparatuses regarding the application, and
the plurality of information processing apparatuses includes the first information processing apparatus and the second information processing apparatus.

12. The first information processing apparatus according to claim 11, wherein
the plurality of information processing apparatuses further includes a third information processing apparatus,
the priority of the third information processing apparatus is lower than the priority of the second information processing apparatus, and
the third information processing apparatus having the lower priority has a lower light emission rate than that of the second information processing apparatus.

13. The first information processing apparatus according to claim 12, wherein the third information processing apparatus having the lower priority has a lower light emission intensity than that of the second information processing apparatus.

14. The first information processing apparatus according to claim 11, wherein the information indicating the priority comprises information indicating whether each information processing apparatus of the plurality of information processing apparatuses is an operator or a spectator of the application.

15. The first information processing apparatus according to claim 1, wherein the information regarding the application display update rate comprises an application display frame rate.

16. The first information processing apparatus according to claim 1, wherein the information regarding the application display update rate comprises an application depth information update rate.

17. The first information processing apparatus according to claim 1, wherein a scheme for the distance measurement comprises a time of flight (ToF) or structured light.

18. A control method, comprising:
in a first information processing apparatus:

executing, by first light emission circuitry of the first information processing apparatus, first light emission of first invisible light for distance measurement;
controlling acquisition of first depth information of a real space based on the first light emission;
controlling an application based on the first depth information, wherein the application executes display of an augmented reality space;
transmitting information regarding the application to a second information processing apparatus, wherein
 the information regarding the application includes information regarding an application display update rate,
 the second information processing apparatus includes second light emission circuitry,
 the second light emission circuitry executes, based on the information regarding the application, second light emission of second invisible light for distance measurement, and
 the second information processing apparatus acquires second depth information of the real space based on of the second light emission; and
controlling the first light emission circuitry to execute the first light emission once at a first light emission timing different from a second light emission timing of the second light emission of the second light emission circuitry, wherein the first light emission circuitry is controlled to execute the first light emission once in one cycle of the application display update rate.

19. A first information processing apparatus, comprising:
first light emission circuitry configured to execute first light emission of first invisible light for distance measurement; and
a central processing unit (CPU) configured to:
 control acquisition of first depth information of a real space based on the first light emission;
 control an application based on the first depth information, wherein
  the application executes display of a first augmented reality space for the first information processing apparatus;
transmit information regarding the application to a second information processing apparatus, wherein
 the information regarding the application contains information regarding an application display update rate of the application,
 the application executes, for the second information processing apparatus, display of a second augmented reality space including at least a part of the first augmented reality space,
 the second information processing apparatus includes second light emission circuitry,
 the second light emission circuitry executes second light emission of second invisible light for distance measurement,
 the second information processing apparatus acquires second depth information of the real space based on the second light emission,
 the second information processing apparatus controls the application based on the second depth information, and
 the second information processing apparatus controls the second light emission circuitry to execute the second light emission once in one cycle of the application display update rate; and
control the first light emission circuitry to execute the first light emission once at a first light emission timing that does not overlap with a second light emission timing of the second light emission of the second light emission circuitry,
wherein the first light emission circuitry is controlled to execute the first light emission once in the one cycle of the application display update rate.

* * * * *